US012579478B2

(12) United States Patent
Hron, II

(10) Patent No.: US 12,579,478 B2
(45) Date of Patent: Mar. 17, 2026

(54) GENERATING AND MODIFYING ONTOLOGIES FOR MACHINE LEARNING MODELS

(71) Applicant: Thomson Reuters Enterprise Centre GmbH, Zug (CH)

(72) Inventor: Joel M. Hron, II, The Woodlands, TX (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 1124 days.

(21) Appl. No.: 17/532,774

(22) Filed: Nov. 22, 2021

(65) Prior Publication Data

US 2022/0164714 A1 May 26, 2022

Related U.S. Application Data

(60) Provisional application No. 63/116,493, filed on Nov. 20, 2020.

(51) Int. Cl.
*G06N 20/20* (2019.01)
*G06F 40/279* (2020.01)

(52) U.S. Cl.
CPC ........... *G06N 20/20* (2019.01); *G06F 40/279* (2020.01)

(58) Field of Classification Search
CPC .................................................... G06N 20/20
See application file for complete search history.

(56) References Cited

U.S. PATENT DOCUMENTS

| | | | | |
|---|---|---|---|---|
| 10,360,503 B2 * | 7/2019 | Goranson | ................ | G06N 5/02 |
| 11,373,249 B1 * | 6/2022 | Hayward | ............. | G06V 30/274 |
| 11,514,414 B2 * | 11/2022 | Benkreira | ............. | G06N 20/00 |
| 2021/0295822 A1 * | 9/2021 | Tomkins | ............. | G06F 16/3338 |
| 2021/0303416 A1 * | 9/2021 | Brenner | ................ | G06F 3/0643 |
| 2021/0303783 A1 * | 9/2021 | Misra | ..................... | G06F 16/345 |
| 2023/0409964 A1 * | 12/2023 | Kurata | ..................... | G06N 3/09 |

OTHER PUBLICATIONS

Liu et al., Secure Federated Transfer Learning, arXiv:1812.03337v1 [cs.LG] Dec. 8, 2018; Total p. 9 (Year: 2018).*
Matthew Horridge, A Practical Guide to Building OWL Ontologies Using Protege 4 and CO-ODE Tools Edition 1.3, The University of Manchester; Mar. 2011; Total p. 108 (Year: 2011).*

* cited by examiner

*Primary Examiner* — Alan Chen
(74) *Attorney, Agent, or Firm* — Derek D. Donahoe; Polsinelli PC

(57) ABSTRACT

A method performed by a machine learning system that involves obtaining a first ontology that includes one or more labels. Each label is associated with a sample that includes text. The ML system is configured to use a particular label to retrieve one or more samples associated with the particular label. The method further involves receiving an identification of a label of a first ontology associated with a first machine learning model to share with a second ontology associated with a second machine learning model and sharing the label and the information with the second ontology. The method further involves training the second machine learning model using the shared information associated with the label.

19 Claims, 7 Drawing Sheets

Figure 4:
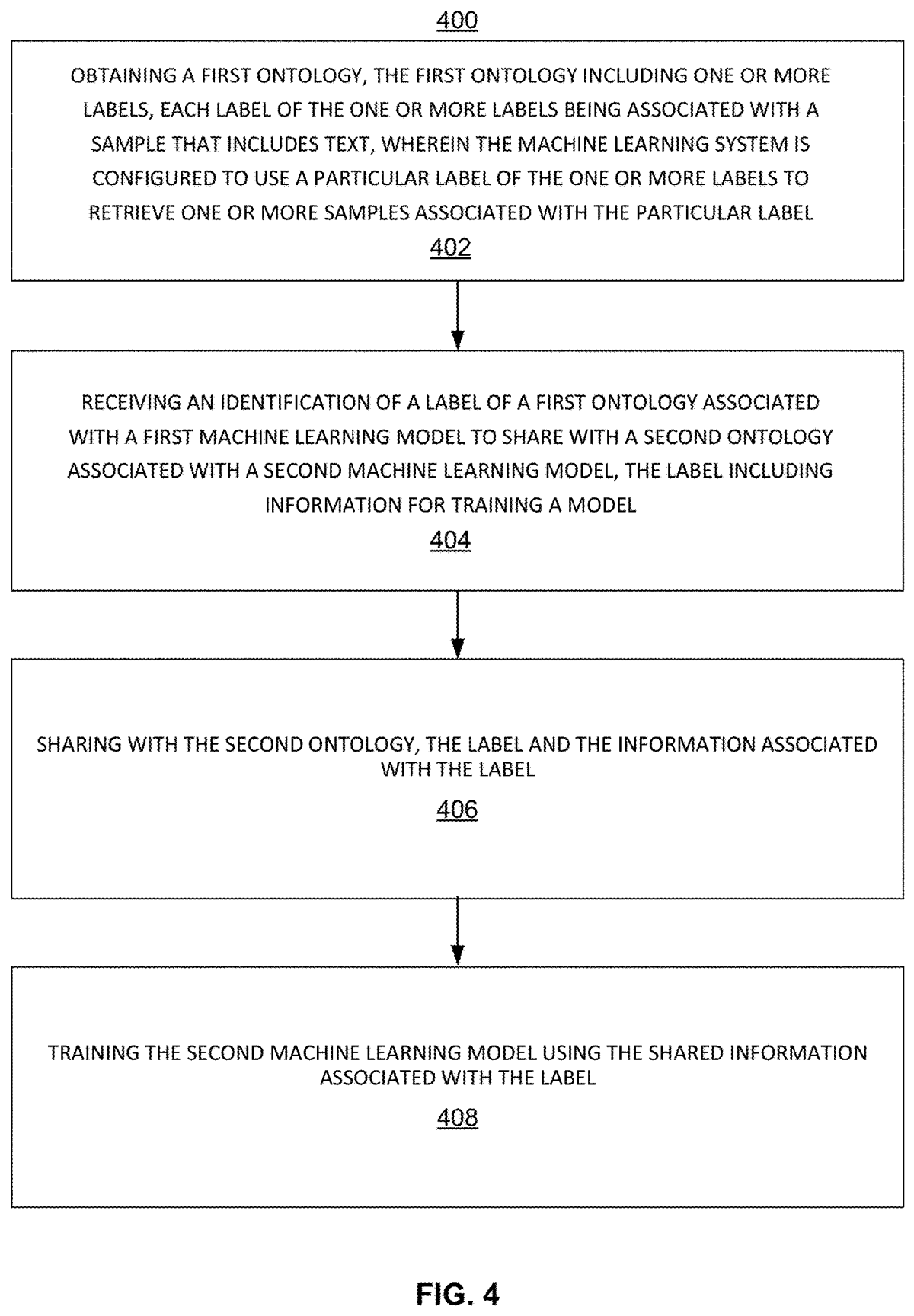

400

OBTAINING A FIRST ONTOLOGY, THE FIRST ONTOLOGY INCLUDING ONE OR MORE LABELS, EACH LABEL OF THE ONE OR MORE LABELS BEING ASSOCIATED WITH A SAMPLE THAT INCLUDES TEXT, WHEREIN THE MACHINE LEARNING SYSTEM IS CONFIGURED TO USE A PARTICULAR LABEL OF THE ONE OR MORE LABELS TO RETRIEVE ONE OR MORE SAMPLES ASSOCIATED WITH THE PARTICULAR LABEL

402

RECEIVING AN IDENTIFICATION OF A LABEL OF A FIRST ONTOLOGY ASSOCIATED WITH A FIRST MACHINE LEARNING MODEL TO SHARE WITH A SECOND ONTOLOGY ASSOCIATED WITH A SECOND MACHINE LEARNING MODEL, THE LABEL INCLUDING INFORMATION FOR TRAINING A MODEL

404

SHARING WITH THE SECOND ONTOLOGY, THE LABEL AND THE INFORMATION ASSOCIATED WITH THE LABEL

406

TRAINING THE SECOND MACHINE LEARNING MODEL USING THE SHARED INFORMATION ASSOCIATED WITH THE LABEL

ACCESS A FIRST TRAINING DATA SET CORRESPONDING TO A FIRST DEVICE, THE FIRST TRAINING DATA SET INCLUDING A FIRST SET OF ENTITIES THAT EACH INCLUDE TEXT AND, FOR EACH ENTITY OF THE FIRST SET OF ENTITIES, ONE OR MORE LABELS ASSOCIATED WITH THE ENTITY OF THE FIRST SET OF ENTITIES EACH LABEL OF THE ONE OR MORE LABELS ASSOCIATED WITH THE ENTITY OF THE FIRST SET OF ENTITIES REPRESENTING A CLASSIFICATION OF AT LEAST A PORTION OF THE TEXT OF THE ENTITY OF THE FIRST SET OF ENTITIES INTO ONE OR MORE CATEGORIES

502

USE THE FIRST TRAINING DATA SET AS INPUT TO A MACHINE LEARNING MODEL ENGINE OF A MACHINE LEARNING SYSTEM

504

RECEIVE A MACHINE LEARNING MODEL FROM THE MACHINE LEARNING MODEL ENGINE, WHEREIN THE MACHINE LEARNING MODEL ENGINE USES THE FIRST TRAINING DATA SET TO OUTPUT THE MACHINE LEARNING MODEL

506

RECEIVE, FROM A SECOND DEVICE, A FIRST MODEL INPUT

508

INPUT THE FIRST MODEL INPUT TO THE INSTANCE OF THE MACHINE LEARNING MODEL, WHEREIN THE INSTANCE OF THE MACHINE LEARNING MODEL IS CONFIGURED TO USE THE FIRST MODEL INPUT TO GENERATE A FIRST MODEL OUTPUT

510

ALLOW ACCESS OF THE FIRST MODEL OUTPUT TO THE FIRST DEVICE AND THE SECOND DEVICE

GENERATING AND MODIFYING ONTOLOGIES FOR MACHINE LEARNING MODELS

CROSS-REFERENCE TO RELATED APPLICATION

This application is related to and claims priority under 35 U.S.C. § 119 from U.S. Provisional Application No. 63/116,493 filed Nov. 20, 2020 entitled "Generating and Modifying Ontologies for Machine Learning Models," the entire contents of which are fully incorporated by reference herein for all purposes.

TECHNICAL FIELD

The present disclosure relates to creating and modifying ontologies for machine learning models that perform natural language processing of documents. Aspects of the disclosure involve label sharing.

BACKGROUND

Machine learning involves computer models that can evolve or "learn" from "training" data to allow the models to ingest similar data and predict or generate outputs concerning that data. Supervised learning is a model training technique that involves labeling training data with a corresponding desired output value. Because the labels are applied to the training data by human trainers, one challenge of supervised learning techniques is receiving sufficient numbers and different types of labeled input-output pairs to effectively train a model. This challenge is exacerbated by the fact that the subjects of the models may be highly specialized and complex requiring experts in different fields to supply the training data. Thus, labeling an input value can be difficult for a human trainer that does not have sufficient knowledge, breadth, and/or depth, of a topic that a model is trained to process.

It is with these observations in mind, among others, that aspects of the present disclosure were concerned and developed.

SUMMARY

Embodiments of the subject matter concern natural language processing systems and methods. One general aspect includes a method performed by a machine learning system comprising one or more processors, the method comprising obtaining a first ontology, the first ontology including one or more labels, each label of the one or more labels being associated with a sample that includes text, wherein the machine learning system is configured to use a particular label of the one or more labels to retrieve one or more samples associated with the particular label. The method further involves receiving an identification of a label of a first ontology associated with a first machine learning model to share with a second ontology associated with a second machine learning model, the label including information for training a model and sharing with the second ontology, the label and the information associated with the label. Finally, the method involves training the second machine learning model using the shared information associated with the label.

Another embodiment involves a system comprising a first ontology stored in a first computer readable medium, the first ontology including a first label and information associated with the first label, the information useful to train a first machine learning model to identify a category of information represented by the first label. The system also involves a second ontology stored in a second computer readable medium. The system includes a processor to run computer executable instructions to cause the processor to: generate a user interface, the user interface depicting a representation of the first ontology, and operable to share the first label and information associated with the first label with the second ontology whereby the second ontology includes the first label and information associated with the first label, the information useful to train a second machine learning model to identify the category of information represented by the first label.

These and other embodiments are discussed in more detail below.

BRIEF DESCRIPTION OF THE DRAWINGS

FIG. 4 is a flowchart of a method for label sharing including information related to a label of a first ontology in a second ontology;

FIG. 5 is a flowchart of a method for outputting, by a machine model engine, a machine learning model.

DETAILED DESCRIPTION

Figure 1:
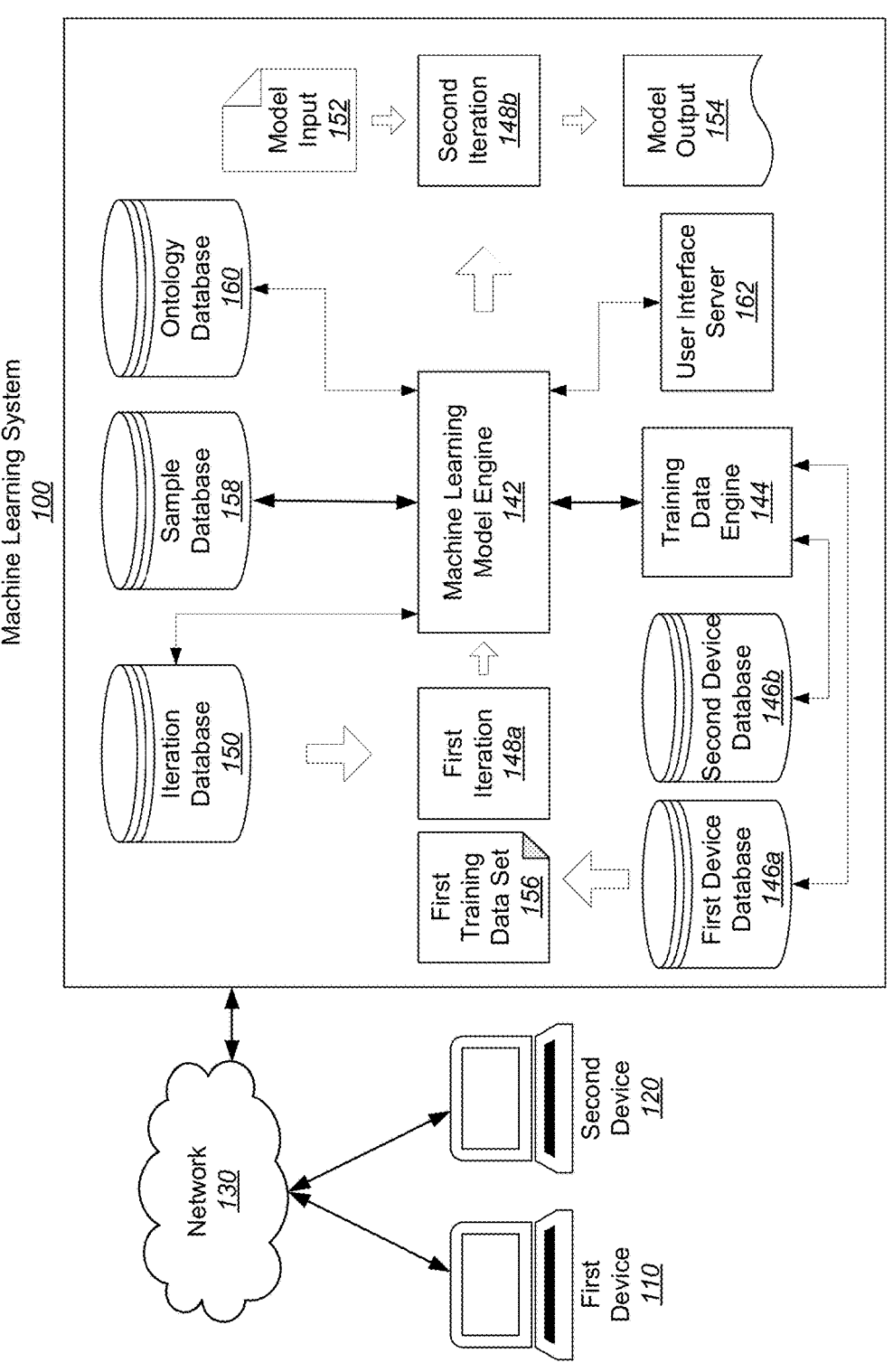
FIG. 1 is a system diagram for a machine learning system for documents, in accordance with various embodiments of the subject technology.

A machine learning model includes certain data structures, parameters, and weights associated with the parameters, the combinations of which are used to process (e.g., recognize patterns in) model inputs and generate associated model outputs. A machine learning model can be trained using one or more training data sets to perform a certain task, e.g., categorize text from a particular type of document. For example, a machine learning model can be trained to receive a document containing text and assign labels to one or more portions of the text according to a category of information conveyed by the text.

A label is a tag assigned to text, typically a span of text, which summarizes the text placing it into a category of information described by the label. For example, a legal contract includes numerous different provisions—financial terms, various different obligations of the parties to the contract, venue, choice of law, a notice period, etc. The text corresponding to each of the various provisions may be labeled. In one example of labeling, a label may be applied to text of a contract provision that includes information associated with a notice period part of a contract. A subject matter expert, accessing a system through a graphical user interface or a machine learning system configured to review text and assign labels to the reviewed text, assigns a label titled "NoticePeriod" or the like to create within the system an association between the selected text of the contract that encompasses the notice period provision and the label. Some text may be associated with different categories; hence, text can be assigned to more than one label, overlapping spans of text assigned to more than one label, and the like.

The specific portion of labeled text is referred to as a sample. The machine learning system can include one or more databases for storing samples and an indexing scheme that allows the machine learning system to retrieve from the database, samples that relate to a particular label. The system can use the samples then to train a model. It should be appreciated that while it is possible for a label to be associated with only one sample, it will often be the case that a label has many samples in the system.

An ontology includes a set of labels the model is to be trained to infer, data related to the set of labels, data related to one or more samples associated with each of the one or more labels, and information used to train a machine learning model to perform a certain task based on the labels and samples of the ontology. The data related to the one or more samples may include the text but is not limited to the text or only include the text as discussed in more detail below. Stated differently, an ontology defines the labels (categories) a model is trained to recognize. The ontology may also include or otherwise include reference to samples of the labels, which samples can be used to train the model. Each ontology can correspond to a different type of machine learning model (e.g., a different type of model input that the corresponding machine learning model of the ontology is trained to process).

To expand on the explanation, different forms of legal contracts typically have different provisions (and hence different categories of text); thus, machine learning models trained to infer the provisions of the respective contracts can have respective and different ontologies, with labels for the respective provisions of the respective contracts with each ontology having samples and labels specific to its respective type of legal contract or even different types of documents and information all together. For example, a first ontology can be used to train a machine learning model for inputs related to Master Service Agreements (MSAs), while a second ontology can be used to train a machine learning model for inputs related to Technology Agreements (TAs). It should be appreciated that while the models and ontologies may be different, they may also overlap or be similar in some ways. For example, although an MSA is different from a TA, each may have overlapping provisions (provisions that are common to both type of agreements) such as choice of law, venue, warranties, etc. Thus, as discussed herein, aspects of the disclosure involve sharing overlapping labels with different ontologies to avoid replicating the creation of labels or expedite creating an ontology for a new agreement and expedite generation of samples to train the new model for the new agreement.

Training a machine learning model using an ontology, and more particularly the training data of an ontology or simply the training data if separate from the ontology, refers to adjusting the weights associated with the one or more parameters of the machine learning model to configure the model to use the associations between the one or more labels and the one or more samples associated with the one or more labels of the ontology to make similar associations between labels of the ontology and information provided as input to the model. When a model is trained to identify labels of an ontology, the model will receive a document it has been trained to analyze and identify text that it determines matches the sample text of the respective labels of the ontology.

A training data set includes one or more sample-label pairs (e.g., one or more associations between a sample and at least one label assigned to the sample). For example, a training data set can include text associated with a label that corresponds to a category describing the text. Referring to the example introduced above, the sample text may include the phrase "Notice Period" and other text, while the label can be "NoticePeriod", which categorizes the sample text into a category of notice periods.

Aspects of the present disclosure involve a machine learning system and associated methods for modifying or generating an ontology for a machine learning model by sharing data related to one or more labels from a source ontology to a destination ontology. The destination ontology can be an existing ontology to be modified or a new ontology to be generated. For example, a subject matter expert can select a label from a source ontology and the machine learning system can share the label with a destination ontology (e.g., by transferring a copy of the label to the destination ontology or by transferring a reference to a location in a memory unit where the label is stored). Associating a label with a new ontology without the associated sample text, allows the system to reduce the amount of memory storage used when a label is shared because duplicate data (e.g., a copy of the shared label) need not exist in two distinct places in memory. Moreover, training a new model is expedited as the second model can take advantage of the training data from an earlier model.

In addition to sharing a label with the destination ontology, the machine learning system can also grant access to or transfer the one or more samples associated with the label. For example, the machine learning system can grant an ontology limited access to the one or more databases that store samples, the access being limited such that the ontology can retrieve only the samples associated with the one or more labels of the ontology. In this way, the system can use and benefit from samples as part of different ontologies to train different models while at the same time prohibiting or restricting access to the sample data to maintain confidentiality of the same.

In some embodiments, the same machine learning model may be used by multiple groups of users, e.g., different individuals and organizations with unique but similar data sets and processing needs, which each provide its own input to and receive its own output from the machine learning model. Aspects of the present disclosure are based on the recognition that because each user group may want the machine learning model to be able to categorize a certain type of text, e.g., text that is specific to the categories that the user group works with most often, it may be advantageous to use training data provided directly by system users and/or by multiple user groups to train a single model. While multiple user groups may contribute training data to train a machine learning model, the user groups may want their training data to not be accessible to other user groups (e.g., the training data may contain confidential information). To maintain confidentiality, the machine learning system can allow a user group to access training data provided by that user group but prohibit or otherwise control access of the training data to other user groups.

The subject matter can be implemented to achieve at least the following advantages. For example, by using an existing ontology to generate or modify another ontology, a machine learning system can transfer learning between ontologies used to train machine learning models, which can reduce the time and computing resources that the system spends when training models. In addition, because references to a memory location of a label and/or related data such as samples, can be shared between a source ontology and a destination ontology, a label need not be stored redundantly in separate memory locations associated with each ontology, and instead can be stored in one memory location associated with a source ontology, while a reference to that memory location can be stored in the destination ontology. Therefore, the memory allocated to store labels associated with destination ontologies can be reduced. Because a label can be used to retrieve samples from a database, the system can prevent samples from having to be stored in memory reserved for an ontology and prevent redundant sample data from being located in multiple locations in memory, e.g., by not requiring samples to be stored in memory allocated for source or destination ontologies.

The system described herein also provides the advantage of leveraging the scarce expert resources needed to create ontologies and generate the training data for training machine learning models. For example, to generate ontologies for complicated technical transaction documents, an attorney with specialized training in the transaction space (the subject matter expert) may be needed to generate an ontology for any given transaction document and tag spans of text in various different transaction documents of the same type to create the label sample pairs sufficient to train a model for the specific type of document. This effort can be very time consuming. The system provides a mechanism to share the labels and the sample text to create an ontology for an entirely new transaction document, and seed the training data for the model that will analyze the new transaction document without having to newly define the ontology and tag the text for the training data. In some instances, labels from multiple different ontologies (and the associated data) may be used to generate the new ontology, with the subject matter expert then only being left with generating new labels for those not otherwise found in existing ontologies and tagging sample data (e.g., training data) for only those new labels.

In addition to the above advantages, because a model can be trained using data provided by multiple user groups, models receive a diverse set of training data and accordingly models can process more diverse model inputs. User groups benefit from the model diversity in that they can provide less training data to a machine learning model as their training data will be augmented by that of other user groups. Training on user-labeled data is not only beneficial for increasing the diversity of the training data, but also helps to address the scarcity of dedicated trainers and/or dedicated trainers having specialized knowledge.

FIG. 1 depicts one example of a machine learning system 100 for receiving training data for training a machine learning model and using the training data to train the machine learning model. Referring to FIG. 1, the machine learning system 100 is communicatively coupled to a first device 110 and a second device 120 through a network 130. While two devices are illustrated as being connected over a network, the system may connect with one or more devices and devices may be connected in other ways such as directly, in various possible embodiments.

The machine learning system 100 includes a machine learning model engine 142 communicatively coupled to a training data engine 144. The machine learning model engine 142 is configured to receive a machine learning model to be trained and further configured to train the machine learning model using an ontology and/or training data. The machine learning model engine 142 can receive a machine learning model from an iteration database 150, while the engine can receive an ontology from an ontology database 160. The machine learning system 100 further includes a user interface server 162, which provides data used to display a user interface of the system to devices connected to the system (e.g., the first device 110 and the second device 120).

An ontology of the ontology database 160 can include one or more labels, each associated with one or more samples that can be stored in a sample database 158. The machine learning model can receive training data from a database that stores training data, such as a first device database 146a and a second device database 146b, which store training data received from the first device 110 and the second device 120, respectively. While separate databases/data storage are illustrated, it is possible to combine some or all of them, in various embodiments. Similarly, while referred to as separate databases, it should be recognized that data may be stored in a database and different data sets segregated therein.

The machine learning model engine 142 can receive an iteration of a machine learning model (e.g., a machine learning model that has been previously trained) from the iteration database 150 and train the machine learning model using a training data set received from or otherwise accessed from the training data engine 144 or a database that includes training data or otherwise. For example, the machine learning model engine 142 can receive a first iteration 148a of a machine learning model, or simply, the first iteration 148a, from the iteration database 150 and train the first iteration using a first training data set 156 received from the first device database 146a. Machine learning models that have been trained can be stored in the iteration database 150.

The machine learning model engine 142 can train a machine learning model using a training data set to output a first iteration of a machine learning model (e.g., the first iteration 148a) and the engine can train the first iteration 148a using another training data set (e.g., the first training data set 156) to output a second iteration 148b of the machine learning model, or simply, the second iteration 148b. The machine learning model engine 142 can perform this iterative training to improve machine learning models (e.g., based on a newly received training data set). In some implementations, the machine learning model engine 142 can train a machine learning model after every receipt of a training data set.

The training data engine 144 is configured to receive training data (e.g., from the first device 110 or the second device 120) and store the training data in a database. Referring to FIG. 1, the training data engine 144 can store training data received from the first device 110 in the first device database 146a and store training data received from the second device 120 in the second device database 146b. The training data engine 144 can retrieve the training data from the databases 146a and 146b and provide the training data to the first and second devices 110 and 120, respectively, or to the machine learning model engine 142 for use in training a machine learning model. In one example, each user is associated with credentials that allow that user to access data. In the example here, the storage architecture requires distinct access credentials for each user, and hence data may be kept confidential by limiting access appropriately. Conversely, the model may access training data (including ontologies) from different databases to train the model, and because the model does not retain the actual training data, data confidentiality is maintained even when different users access the model. Hence, separate databases are used to differentiate training data received from different devices to ensure that training data received from a particular device is accessible to that device and not accessible to other devices, in one example. Any number of databases can be used so long as a particular device is able to access training data provided by the device, while other devices are not able to access the training data provided by the particular device.

In addition to using training data, the machine learning system 100 can also use an ontology to train a machine learning model. A subject matter expert can use a user interface of the machine learning system 100 to view data related to the one or more labels of an ontology.

Figure 2:
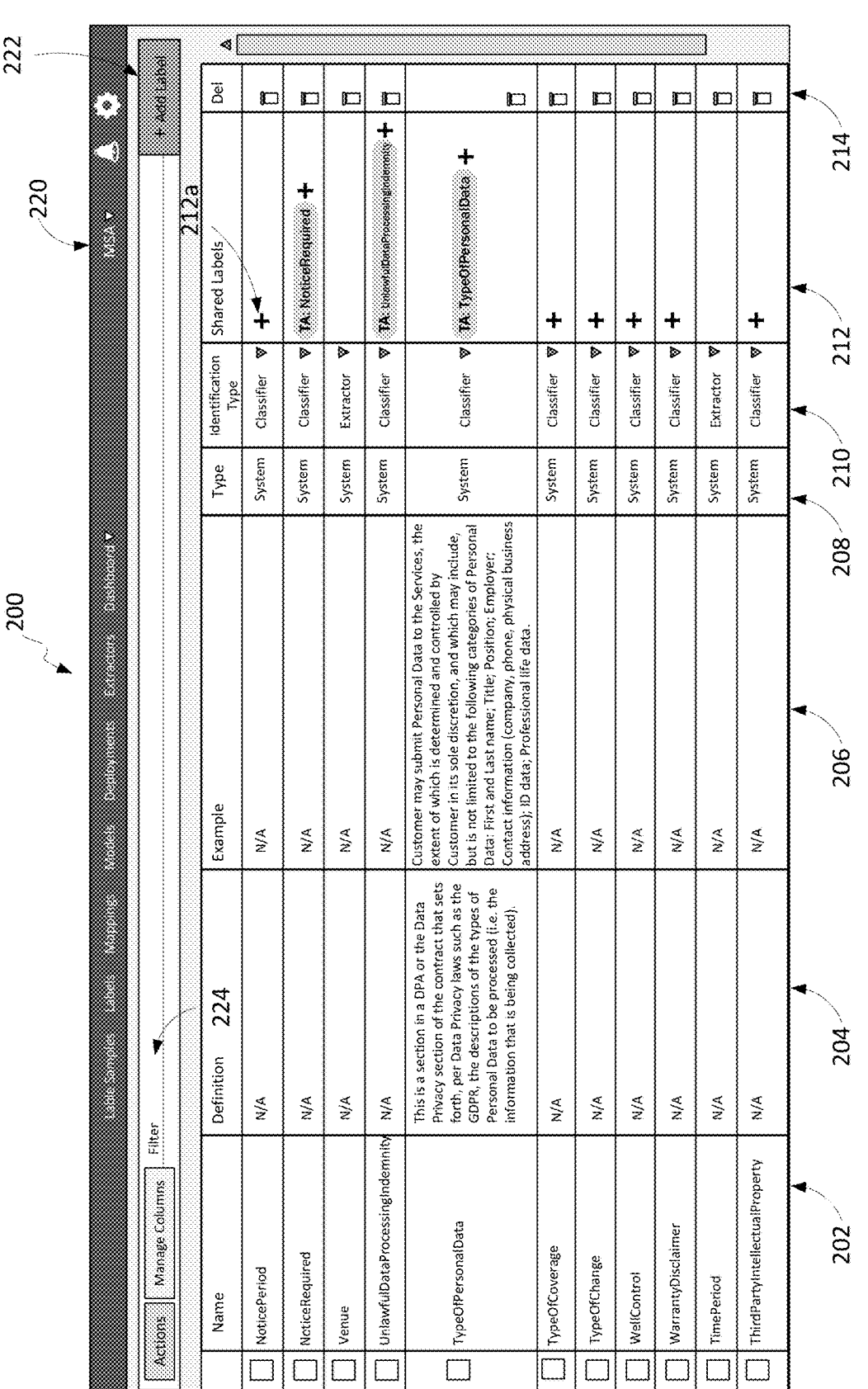
FIG. 2 is a diagram of an example user interface for a machine learning system.

FIG. 2 is a diagram of an example user interface 200 for a machine learning system (e.g., machine learning system 100). The user interface may be served from the user interface server 162 and accessible by a user through a browser on a user device, for example the first user device 110 or the second user device 120. The user interface provides one way by which a label from one ontology may be shared with a different ontology. FIG. 4 illustrates one example of a method of sharing labels according to one embodiment. Referring now to FIG. 2, and FIGS. 1 and 4, among others, to share labels a user first accesses the user interface. The user interface includes a label name column 202 which lists the names of labels of an ontology and an ontology name 220 corresponding to the name of the ontology. The ontology name 220, in the example set out in FIG. 2 is "MSA", and the user interface 200 displays information related to an MSA ontology. A user, which will be referred to as a subject matter expert but can be any type of user, can select a different ontology to view (e.g., by clicking on the name 220 and selecting an ontology from a dropdown menu that appears). After the subject matter expert selects an ontology, the machine learning system 100 can retrieve from the ontology database 160 information related to the selected ontology (e.g., the information shown and described with respect to FIG. 2).

Using a graphical button 222, a subject matter expert can create new labels, e.g., by specifying a name for the new label using a text entry box that appears when the button 222 is selected. When a subject matter expert creates a new label, the machine learning system 100 can allocate a portion of memory to store the new label. Following the creation of a new label, a subject matter expert (e.g., the subject matter expert that created the new label, or another subject matter expert) can assign a portion of text of a document as a sample associated with the new label. Labels can be deleted using a graphical button 214. The label and the associated text, along with additional samples of text for the label, are used to train an MSA machine learning model.

The user interface 200 includes a definition column 204. For one or more labels of the label name column 202, the user interface can display a definition of the label (e.g., a definition provided by a subject matter expert, describing the category of text that the label corresponds to). For example, the list of labels 202 includes a label named "TypeOfPersonalData" that includes a definition of the label.

The user interface 200 includes an example column 206. For one or more labels of the label name column 202, the user interface can display an example of the label (e.g., one or more sample texts associated with the label). For example, the TypeOfPersonalData label includes a sample of text, displayed in the example column 206, that corresponding to the label. So, from an MSA, for the TypeOfPersonalData label an example of text that comports with a type of personal data is included in the example field. It should be recognized that for training purposes, there may be and likely will be in many cases, several examples of text for each label. A subject matter expert can select (e.g., from a sample database) the one or more samples of the example column 206 as one or more representative samples for a particular label.

The user interface 200 includes a filter text box 224. A subject matter expert can use the filter text box 224 to filter the information displayed by the user interface 200 (e.g., to search for certain elements of the label name column 202, the definition column 204, the example column 206, the type column 208, the identification type column 210, or a shared labels column 212).

While different ontologies are used to train different machine learning models for different types of model input, some types of model input are similar and accordingly it may be advantageous for certain machine learning models of different ontologies to be trained using similar samples and labels. To facilitate the training of machine learning models that may receive similar model inputs, aspects of the present disclosure involve a system by which labels can be shared between two ontologies. It should be recognized that in some instances a model may include a hard coded rule, something the model analyzes directly and does not need to be trained to perform, and the system may also allow sharing of such rules, and when shared, the shared rule becomes a part of the model. The rule may be a part of an ontology or may be separate from the same.

The user interface 200 includes the shared labels column 212, which displays the name or names of one or more labels shared between the currently selected ontology (e.g., the MSA ontology) and a different ontology. In the example of FIG. 2, the shared labels column 212 displays the labels NoticeRequired, UnlawfulDataProcessingIndemnity, and TypeOfPersonalData as shared labels. Before the name of the shared labels is text that reads "TA:", which indicates that the labels are shared with the Technology Agreement (TA) ontology.

Referring now to FIG. 4, a flowchart 400 depicts an example method whereby the system may share information related to a label of a first ontology with a second ontology. The example process will be described as being performed by a machine learning system of one or more processors. For example, the machine learning system 100 can perform the example process.

In operation 402, the system accesses or otherwise obtains a first ontology from a database or other storage. The first ontology includes one or more labels and each label of the one or more labels can be associated with a sample that includes text. The machine learning system is configured to use a particular label of the one or more labels to retrieve one or more samples associated with the particular label.

The first ontology can include labels that were assigned by a subject matter expert. For example, a subject matter expert can receive a document that includes text corresponding to a particular type of document such as an MSA. Using a user interface (e.g., like the UI introduced in FIG. 2) of the machine learning system (e.g., an interface that displays at least a portion of the document) a subject matter expert assigns labels to portions of text of the document according to a category of information that the text relates to. For example, an MSA can include text related to a notice period, which the subject matter expert can assign the label "NoticePeriod" or the various labels and text discussed with respect to FIG. 2 as examples. The user interface can display one or more existing labels and the subject matter expert can choose a particular label to assign to text.

The machine learning system uses the particular label to add to the first ontology. An ontology can be stored in a memory unit (e.g., the data of the ontology that is stored in the memory unit can include a set of names of one or more labels associated with the ontology). For example, the machine learning system 100 can include the NoticePeriod label in a set of labels associated with the MSA ontology. The particular label is associated with a portion of text of the document, which the machine learning system can store in a database (e.g., the sample database 158) as a sample. As noted above, in most instances the system will include more than one sample of any given label, and may include many samples, of a given label. The machine learning system can use the particular label to retrieve the sample (or samples) from the database. For example, data related to the particular label (e.g., the name of the label) can be input to a hash function that outputs a hash value corresponding to a memory location in the database. The machine learning system 100 can use the hash value to retrieve a sample from the database.

In operation 404, the system receives an identification of a label of the first ontology to share with a second ontology. The first ontology may be associated with a first machine learning model and the second ontology associated with a second machine learning model, which may be distinct from the first model. The machine learning system can determine the label that is to be shared based on input received from a subject matter expert. A label shared between two ontologies corresponds to a category of text that the machine learning models of the two ontologies may both be likely to receive as input. For example, an MSA ontology and a TA ontology may both receive text related to the concept of notice periods. If a "NoticePeriod" label is already present in the MSA ontology but not present in the TA ontology, the label may be shared (along with references to the sample text for the labels) between the MSA ontology and the TA ontology. The label includes information for training a model. If the label originates with the first ontology and therefore the first model, it is associated with information for training the first model. When shared, the information may then be used to train the second model.

In one example, as introduced above, a person can use the interface 200 to designate a label to share between a source ontology and a destination ontology. In one example, a subject matter expert uses a graphical button 212*a* of the shared labels column 212 to designate an ontology with which to share a corresponding label of the label name column 202. For example, the graphical button 212*a* is in the same row as the label NoticePeriod. Selecting the graphical button 212*a* can display a graphical box that allows the subject matter expert to input the name of an ontology with which to share the corresponding NoticePeriod label. For example, the subject matter expert can select the graphical button 212*a* and input "TA" to share the NoticePeriod label from the MSA ontology to the TA ontology.

In some implementations, the second ontology is an existing ontology that includes one or more labels. Accordingly, the machine learning system adds a label to the existing ontology. For example, the shared labels column 212 of the user interface 200 shows that the three labels NoticeRequired, UnlawfulDataProcessingIndemnity, and TypeOfPersonalData are labels shared from the MSA ontology to the TA ontology. Therefore, if a subject matter expert shared the NoticePeriod label with the TA ontology, the ontology would include the NoticePeriod label in addition the three labels listed above.

In some implementations, the second ontology is a new ontology and the copy of the label of the first ontology is a first label of the second ontology. For example, after selecting the graphical button 212*a*, a subject matter expert can specify a name of a new ontology as the second ontology with which the label is to be shared. Accordingly, the machine learning system can create a new ontology (e.g., by allocating memory in a memory unit for the information of the new ontology). The machine learning system can add the copy of the label of the first ontology to the memory allocated for the new ontology. The machine learning system can also add the information related to the label of the first ontology to the memory allocated for the new ontology.

In operation 406, the system includes in the second ontology a copy of the label of the first ontology and information related to the label of the first ontology. Stated differently, the method involves sharing with the second ontology, the label and the information associated with the label, The machine learning system can include the label (e.g., the name of the label or a reference to a location in a memory unit where the label is stored) in the portion of memory where the second ontology is stored. For example, the portion of memory where the TA ontology is stored can be updated so that the set of labels associated with the ontology includes the NoticePeriod label shared from the MSA ontology, or the portion of memory where the TA ontology is stored can be updated to include a reference to the NoticePeriod label.

In some implementations, in addition to a name or reference to the label of the first ontology, the information related to the label of the first ontology can include one or more machine learning parameters and a weight associated with each of the one or more machine learning parameters. For example, the machine learning system can use the label and one or more samples associated with the label to train a machine learning model. In some implementations, training a machine learning model can include adjusting the weights associated with the one or more parameters of a machine learning model. For example, a machine learning model can include a first set of weights associated with certain parameters of the model. After the machine learning system trains the machine learning model using a label and one or more samples associated with the label, the weights associated with the certain parameters may be updated to new weights associated with the certain parameters. The machine learning model can associate the label with the new weights associated with the certain parameters. When the machine learning system includes the label in the portion of memory where the second ontology is stored, the system can include new weights associated with the certain parameters.

In some implementations, in addition to a name or reference to the label, the information related to the label of the first ontology can include features associated with the label of the first ontology. As discussed herein, one example of information associated with a label is the sample (and likely samples) of text for the label. Alternatively or in addition, a feature can be a machine learning representation of one or more portions of text and/or any other defining characteristic of that portion of text, such as font type, positioning in the page relative to other text, and the like.

For example, machine learning system can collect multiple samples associated with a particular label and compile the multiple samples into a representation that allows the machine learning system to analyze the text included in those samples. For example, the representation can be a vector representation of the samples. The machine learning model can use the collection of samples to determine features such as one or more repeated characters, words, or phrases present in most or all of the samples. For example, the machine learning model can generate a vector representation of all samples associated with the NoticePeriod label.

This vector representation may be shared alone or in addition to the samples themselves. Analyzing the vector representation, the machine learning model can determine that all samples associated with the NoticePeriod label include the words "notice period" and specify that "notice period" is a feature of the NoticePeriod label. The machine learning system can associate a label with the characters, words, or phrases of a feature. For example, the machine learning system can associate the NoticePeriod label with the words "notice period" by adding the characters of these words to a portion of memory that corresponds to features of the NoticePeriod label. Thus, the information that may be shared, along with a label itself, includes the samples of text associated with the label, a vector representation of the text, feature representations of the text or the label, machine learning model weights alone or in various combinations. Moreover, in any given ontology, a label may be shared with the various information types, and sharing the label may include each type of information associated with the label, or the system may allow only some information of the label to be shared. For example, assume that label has both many samples of text for the label as well as a feature representation indicating the location at which the sample typically appears in the document associated with the ontology of the label, it may be possible to share the label and the sample text with a second ontology but not the feature, if for example, the labeled information typically occurs elsewhere in the document type for the second ontology. Hence, sharing the feature may incorrectly train the model of the second ontology.

When a machine learning system includes information related to the label of the first ontology in the second ontology, the information can include one or more features associated with the label. For example, when the machine learning system includes the NoticePeriod label from the MSA ontology to the TA ontology, the machine learning system can include the "notice period" feature or a reference to the "notice period" feature.

Referring again to FIG. 4, the shared label and particularly information associated with the shared label may be used by the system to train a model. In the example discussed, the label is shared from the first ontology to the second ontology, and the system trains the second machine learning model using the shared information associated with the label (operation 408). The machine learning system is configured to use the first ontology and the second ontology to train a first machine learning model associated with the first ontology and a second machine learning model associated with the second ontology, respectively. The machine learning system can use the second ontology, which includes the label shared from the first ontology, to train a machine learning model. The machine learning model can use one or more of: one or more samples associated with the label, one or more machine learning parameters and a weight associated with each of the one or more parameters, and one or more features associated with the label to train a machine learning model.

For example, whereas the second ontology was not able to access the samples associated with the shared label before it was shared (e.g., because the second ontology did not have the shared label to use in searching the sample database 158), after it is shared, the second ontology can access one or more samples associated with the shared label. Labels of an ontology and their corresponding samples are used to train a machine learning model that corresponds to the ontology. Accordingly, a destination ontology can use samples associated with a shared label to train a machine learning model of the destination ontology, which can reduce, in some instances dramatically, the amount of time it would take for a subject matter expert to build the destination ontology, and subsequently train, the machine learning model of the destination ontology. Moreover, the system may use the same data in two separate training applications rather than using separate data and taking up storage resources for the same. Because the subject matter expert can choose the labels to be shared, ontologies can be built more efficiently by only sharing labels with samples that have been used to train machine learning models that the subject matter expert has determined are effective in identifying certain patterns in a model input.

Using a second (e.g., destination) ontology, which includes a copy of a label shared from the first (e.g., source) ontology, to train the second machine learning model associated with the second ontology includes using one or more labels of the second ontology, including the copy of the label of the first ontology, and, for each of the one or more labels of the second ontology, a sample associated with the label to configure the second machine learning model to assign a label of the one or more labels of the second ontology to one or more portions of text of a model input received by the second machine learning model. For example, the second ontology can be the TA ontology which can include the NoticePeriod label from the MSA ontology. The machine learning system can train a machine learning model using the one or more labels and the one or more samples associated with each of the one or more labels of the TA ontology. That is, one of the labels and associated sample or samples used to train the TA ontology can be the NoticePeriod label and the one or more samples associated with the label.

In some implementations, the second ontology is an existing ontology that includes one or more labels. Accordingly, the machine learning system adds a label to the existing ontology. For example, the shared labels column 212 of the user interface 200 shows that the three labels NoticeRequired, UnlawfulDataProcessingIndemnity, and TypeOfPersonalData are labels shared from the MSA ontology to the TA ontology. Therefore, if a subject matter expert shared the NoticePeriod label with the TA ontology, the ontology would include the NoticePeriod label in addition the three labels listed above.

In some implementations, the second ontology is a new ontology and the copy of the label of the first ontology is a first label of the second ontology. For example, after selecting the graphical button 212a, a subject matter expert can specify a name of a new ontology as the second ontology with which the label is to be shared. Accordingly, the machine learning system can create a new ontology (e.g., by allocating memory in a memory unit for the information of the new ontology). The machine learning system can add the copy of the label of the first ontology to the memory allocated for the new ontology. The machine learning system can also add the information related to the label of the first ontology to the memory allocated for the new ontology.

For example, creating a new ontology is advantageous when a subject matter expert wants to train a machine learning model on a subset of samples of the machine learning system 100 (e.g., if the subject matter expert wants to test a machine learning model's efficiency at recognizing a particular pattern or at recognizing a particular category of text included in a model input). The subject matter expert can also specify other information to associate with the new ontology, e.g., the name of the ontology.

A subject matter expert can share a particular label from a source ontology to a destination ontology that already includes a copy of the particular label. For example, a device can add to the training data of the source ontology by sending a sample associated with the particular label to the machine learning system 100. The machine learning system 100 can add the sample to the training data of the source ontology (e.g., by allowing the source ontology to access the sample from where it is stored in the sample database 158 of the machine learning system). The destination ontology may include a copy of the particular label but may have access to one or more samples that the source ontology does not have access to and may not have access to the sample sent by the device. Sharing the particular label from the source ontology to the destination ontology can result in the training data of the destination ontology being updated to include the samples of the source ontology that are not already included in the training data of the destination ontology. For example, the training data of the destination ontology may not include the sample received by the device so the machine learning system 100 can allow access of the destination ontology to the sample when the subject matter expert shares the particular label from the source ontology to the destination ontology.

Allowing a destination ontology access to samples associated with a label shared from a source ontology to a destination ontology is an example of one-directional sharing. That is, the information associated with the source ontology (e.g., a label and one or more samples associated with the label) is shared with a destination ontology, while information associated with the destination ontology is not shared with the source ontology. After the label is shared, if the source ontology receives a sample (e.g., from a device communicatively coupled to the machine learning system 100) the machine learning system allows access of the received sample to the destination ontology in accordance with one-directional sharing (e.g., the sample received from the device can be stored in the sample database 158 and the machine learning system can allow the destination ontology to access the sample from the sample database).

In some implementations, label sharing can be two-directional between any ontologies where the system has shared a label. That is, a label can be shared between a source ontology and a destination ontology and the machine learning system 100 allows either ontology to access samples received by the other ontology if the received samples are associated with the shared label. For example, even though a shared label is shared from a source ontology to a destination ontology, if the destination ontology receives a sample associated with the shared label, the machine learning system 100 may automatically link to the new sample, and may also initiate a training sequence of the model using the new sample. Accordingly, an advantage of two-directional sharing is that both the source and the destination ontologies benefit by gaining access to received samples that are associated with the shared label. Moreover, as discussed below in more detail, the system may be configured to manage access to sample shared between ontologies, whether automatically or through a UI, to allow the model to benefit from the training using the new sample while maintaining confidentiality of the sample if necessary. The system may manage confidentiality and access through user information of the ontologies and/or models, for example.

In some implementations, label sharing can be multi-directional. That is, a label can be shared between a source ontology and multiple destination ontologies. When any of the source and destination ontologies receives a sample associated with the shared label, the machine learning system 100 can allow access of the sample received by the ontology to each of the other ontologies with which the sample was shared. In such instances, models of destination ontologies with which a label is shared benefit from training data received by the source ontology, but only the source ontology need receive the training data for the destination ontologies and their models to benefit from the received training data.

In some implementations, a source ontology can share a label with multiple destination ontologies and the sharing can be one-directional sharing between each multiple destination ontology or a mix of one-directional and two-directional sharing. Accordingly, the machine learning system 100 can use label sharing to generate connections between machine learning models that are associated by common labels.

For example, sharing can be one-directional from a source ontology to a first destination ontology and sharing can be two-directional between the first destination ontology and a second destination ontology. The machine learning system 100 can allow access of a sample received by the source ontology to the first destination ontology if the sample is associated with the shared label. Because the sharing is two-directional between the first destination ontology and the second destination ontology, the machine learning system 100 can allow access of the received sample to the second ontology.

As another example, sharing can be one-directional from a source ontology to a first destination ontology and sharing can be two-directional between the source ontology and a second destination ontology. The machine learning system 100 can allow access of a sample received by the source ontology to the first and second ontologies if the sample is associated with the shared label. The machine learning system 100 can allow access of a sample received by the second destination ontology to the source ontology if the sample is associated with the shared label. Because the sharing is one-directional from the source ontology to the first ontology, the machine learning system 100 can allow access of the sample received by the second ontology to the first ontology.

In some implementations, a subject matter expert may want a destination ontology to include one or more labels from a source ontology, while also wanting to associate a shared label of the destination ontology, and only the shared label of the destination ontology, with one or more samples. For example, while the subject matter expert may want certain samples associated with a shared label of a source ontology to be accessible to a destination ontology, the subject matter expert may also want to train the machine learning model of the destination ontology on samples that the subject matter expert does not want to use to train the machine learning model of the source ontology. One advantage of one-directional sharing is that a subject matter expert can associate samples with a copy of a shared label of a destination ontology without associating the samples with the shared label of a source ontology. This allows the subject matter expert to train the respective machine learning models of the source and destination ontologies using different samples for a common label.

While an ontology can include one or more labels, in some implementations, an ontology can include additional information that can be used to further categorize text and other information of a label. For example, in some implementations, an ontology can include groupings of labels, hierarchies of labels, parent and child relationships between labels and other organizations that create relationships between labels or the information associated with the labels. The information creating relationships between labels may also be shared along with the label itself. In some instances, the system may create the same relationship in the second ontology if the related labels are present in the ontology. Alternatively or in addition, the relationship information may be associated with the label, and the system generates the relationship when a related label is shared. Thus, the second ontology may inherit some or all relationships among labels. New relationships may also be generated in the second ontology, e.g., through the user interface, and relationship information automatically shared with the first ontology and the associated previously shared label. Accordingly, should a label be shared from the second ontology to the first ontology where the shared label had a relationship to a label in the second ontology, the relationship information will be replicated in the first ontology.

In some implementations, an ontology can include additional information that can be used to further categorize text of a sample. For example, in some implementations, an ontology can include at least one concept that can include at least one label. A concept can also be referred to as a provision in the specific context of legal documents. In some implementations, an ontology can include at least one concept that can include at least one sub-concept that can include at least one label. A subject matter expert can determine that most or all documents related to a particular topic, and processed by certain machine learning models, include text related to certain concepts. For example, most or all documents related to MSAs include the legal concepts of assignments and audit rights. Accordingly, an ontology can include a data structure named after a certain concept that includes labels related to that concept. For example, the MSA ontology can include an "Assignment" concept data structure and an "Audit Rights" concept data structure.

Figure 3A:
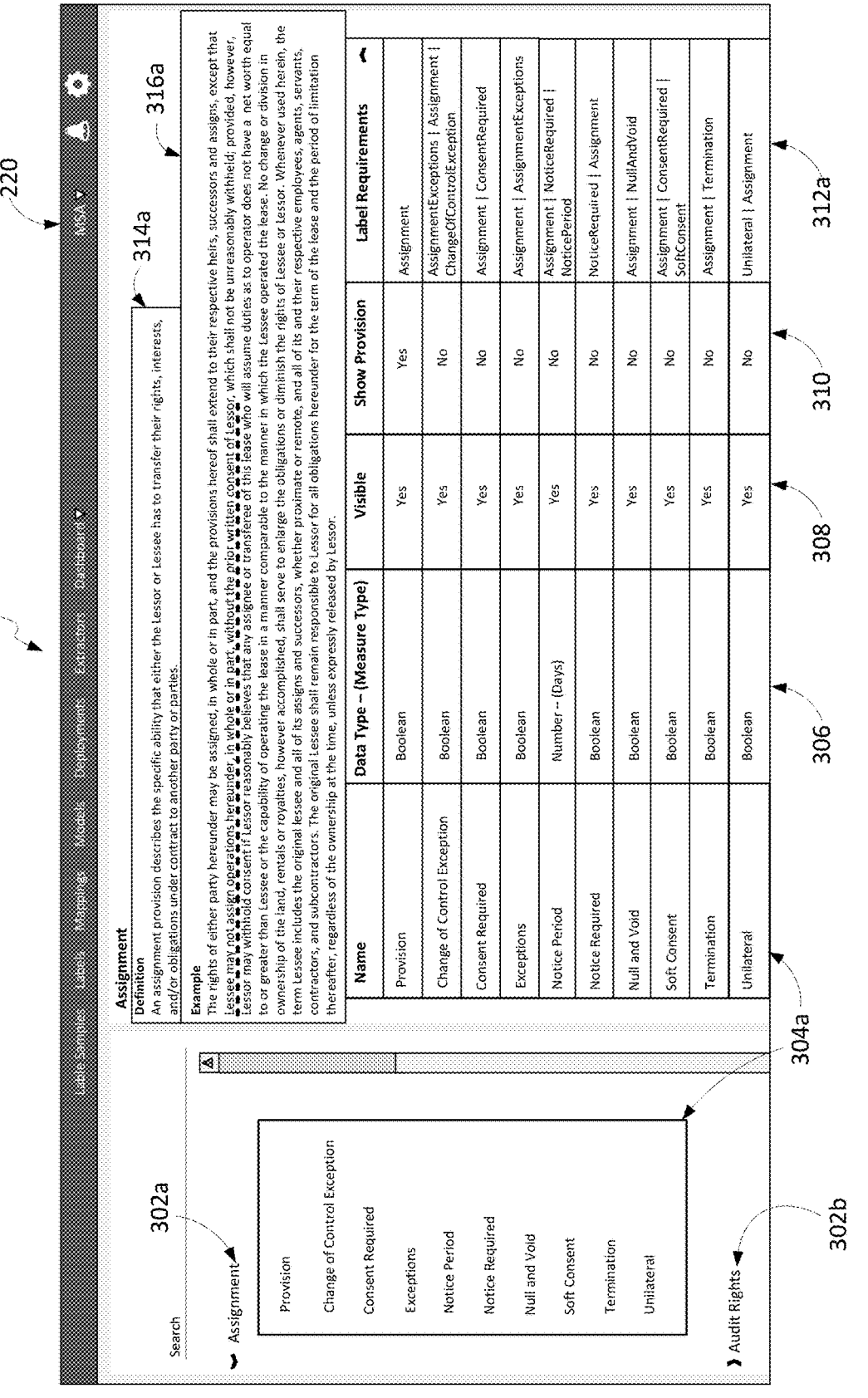
FIG. 3A is a diagram of a user interface showing a first concept and corresponding hierarchy.

Referring now to FIG. 3A, a diagram of a user interface 300A shows a first concept and corresponding hierarchy that includes concepts 302a and 302b and sub-concepts 304a, all of which correspond to the MSA ontology, as indicated by the ontology name 220. The user interface 300A also includes a label requirement column 312a which shows the labels associated with certain sub-concepts. For example, the Notice Period sub-concept can include the labels "Assignment", "NoticeRequired", and "NoticePeriod". The user interface 300A includes a data type column 306, a visible column 308, and a show provision column 310. The data type column 306 includes a type of data corresponding to a particular sub-concept. For example, if a sample includes text related to a notice required by a party in a legal document, the value of the data type associated with the Notice Required sub-concept can be the Boolean value "True", and if a sample includes text related to a notice period, the value of the data type associated with the Notice Period sub-concept can correspond to the number of days for the notice period. The user interface 300A includes a definition section 314a and an example of a sample 316a of text for the label (in this case "Assignment"), which is also a concept including the various identified sub-concepts associated with an assignment clause in a contract. The text in the definition section 314a is a definition of the Assignment concept 302a. It should be noted that "Assignment" may also be a label and the definition is for the concept as well as the label. The sample 316a includes a sample of text for the Assignment concept 302a as well as the Assignment label. The sample 316a also includes text corresponding to at least one sub-concept of the Assignment concept.

Figure 3B:
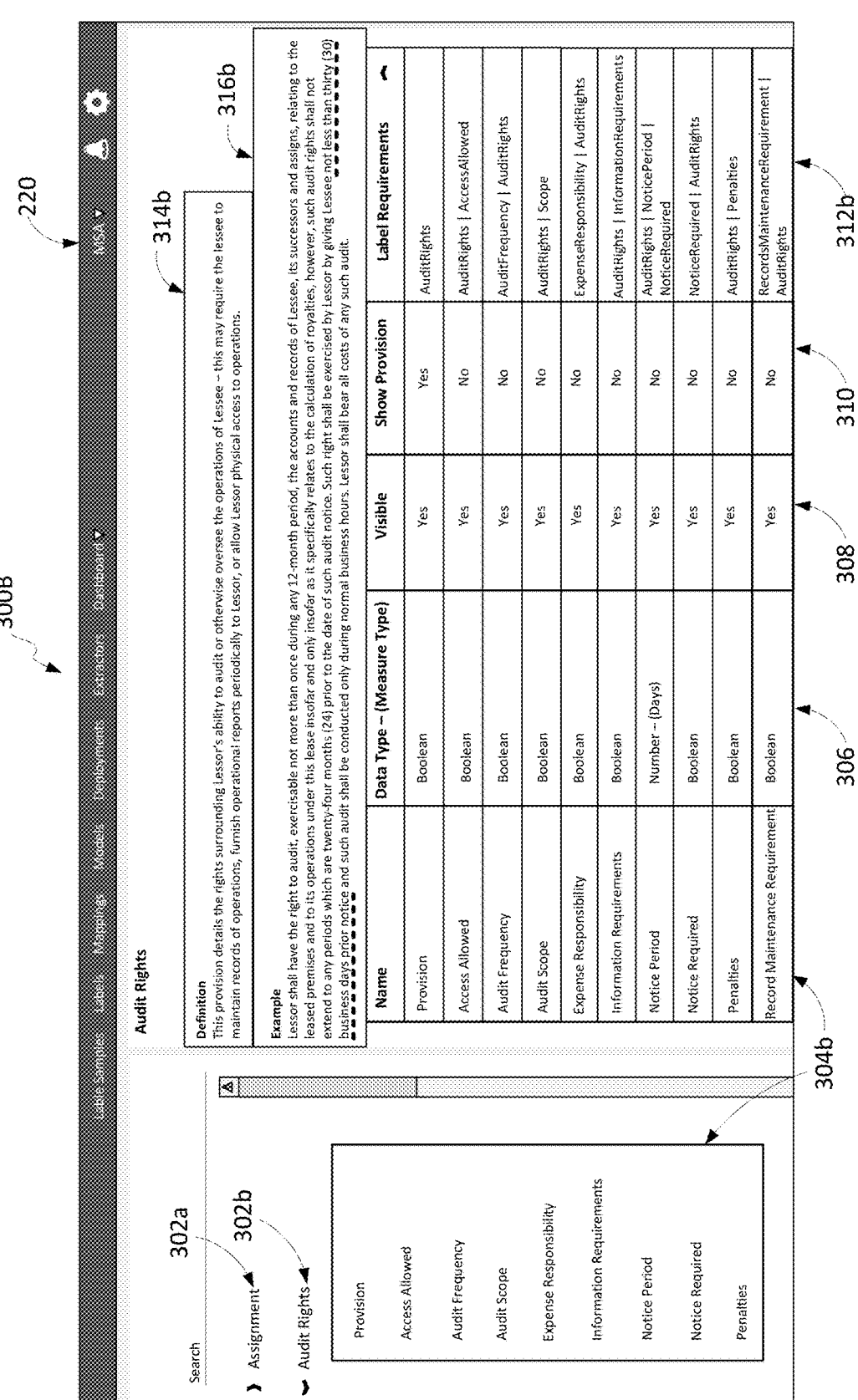
FIG. 3B is a diagram of a user interface showing a second concept and corresponding hierarchy.

Different concept data structures can include the same sub-concept data structures. For example, both the Assignment concept data structure and the Audit Rights concept data structure can include different sub-concept data structures both named "Notice Required". Each sub-concept data structure can include one or more labels and some sub-concept data structures can include the same labels. For example, referring to FIG. 3B, a diagram of a user interface 300B showing a second concept and corresponding hierarchy that includes the concepts 302a and 302b and sub-concepts 304b, all of which correspond to the MSA ontology, as indicated by the ontology name 220. The Audit Rights concept includes the sub-concepts 304b, which include a Provision sub-concept and a Notice Required sub-concept, among other sub-concepts. The user interface 300B also includes a label requirement column 312b which shows the labels associated with certain sub-concepts. For example, the Notice Required sub-concept includes the labels "AuditRights" and "NoticeRequired". The user interface 300B includes a definition section 314b and an example sample 316b. The definition in definition section 314b is an example definition for the Audit Rights concept 302b. The text in the definition section 314b defines the Audit Rights concept 302b. It should be noted that "AuditRights" may also be a label and the definition is for the concept as well as the label. The example sample 316b includes a sample of text for the Audit Rights concept 302b as well as the AuditRights label. The sample 316b also includes text corresponding to one or more sub-concepts of the Audit Rights concept. The sample 316b includes an emphasized portion (dotted lines) that is sample text for the sub-concept Notice Required. The sample text is "not less than thirty (30) business days prior notice," which pertains to at least the Audit Rights sub-concept of Notice Required and accordingly is labeled with the label NoticeRequired. It is also labeled with "AuditRights" as Notice Required is a sub-concept of Audit Rights. FIGS. 3A and 3B show that different concept data structures can include sub-concepts data structures having the same name, but a different set of labels. For example, both the Assignment concept data structure and the Audit Rights concept data structure include a Notice Required sub-concept data structure. Both Notice Required sub-concept data structure of the Assignment concept and the Notice Required sub-concept data structure of the Audit Rights concept include the label "NoticeRequired". The sub-concept data structures differ in that the former includes an Assignment label, while the latter does not, and the latter includes an AuditRights label, while the former does not.

As introduced, besides sharing of labels and associated information, aspects of the present disclosure also may involve federation where the system can use shared labels and/or share information to create and modify ontologies, and use the shared information to train models while restricting access to the underlying data. For example, it may be that text associated with a label for a first ontology for a first model is related to a first client, and the sample text for the label is confidential information of the first client. The system may be configured to allow a user to share the label with a second ontology but prohibit access to the information, e.g., sample text, for the label. In this way, the second ontology may gain the benefit of the label and the sample text, but the confidential sample text for the shared label cannot be accessed or viewed by users of the model associated with the second ontology, or the second model, and/or otherwise depending on the arrangement of the system.

In more detail, in some implementations the system can receive, from a first device, which device or information may be associated with unique identifying information such as a related user ID, a device ID, network ID, company ID, etc., a first training data set for training the first machine learning model. For example, the label of the first ontology can be a NoticePeriod label shared from the MSA ontology to the TA ontology. If the machine learning system receives a sample associated with the NoticePeriod label of the MSA ontology (e.g., the sample can be part of training data received from a device) then the machine learning system can associate the sample with the NoticePeriod label of the TA ontology.

The machine learning system can use the first training data set to train the first machine learning model and output an updated first machine learning model. For example, a machine learning model can be updated when trained (e.g., so that the machine learning model is able to recognize patterns in a model input based on the training data used to train the model). The machine learning system can allow access of the updated first machine learning model to the first device and a second device. That is, although the first training data set was received from the first device, both the first device and the second device can access the updated first machine learning model (e.g., such that both the first and the second device can submit a model input to the update machine learning model).

The machine learning system can receive, from the second device, a first model input and input the first model input to the updated first machine learning model. The updated first machine learning model is configured to use the first model input to generate a model output. The machine learning model can allow access of the model output to the first device and the second device. The machine learning model can allow access of the first training data set to the first device. The machine learning system can deny access of the first training data set to the second device.

To further facilitate the training of machine learning models, the machine learning system 100 can implement federated machine learning techniques. The machine learning system can implement federated machine learning independently or in conjunction with label sharing, sub-concept sharing, and/or concept sharing, which are described above. For example, FIG. 5 describes how a machine learning system can implement federated machine learning techniques.

Referring now to FIG. 5, a flowchart 500 depicts an example method for outputting, by a machine model engine, a machine learning model that has been trained using confidential data from different sources while maintaining the confidentiality of the data. As noted elsewhere, the federated training methodology provides a mechanism to provide additional paths to obtain training data, can provide access to additional subject matter experts, and can provide a model to different parties without breaching the confidentiality of the training data from any of the parties. The example process will be described as being performed by a machine learning system of one or more processors. For example, the machine learning system 100 can perform the example process.

As described above, not only can a machine learning system train a machine learning model using an ontology, the system can also train a machine learning model on a training data set. A training data set typically includes less information than an ontology. For example, while an ontology can include a hierarchy of concepts, sub-concepts, and labels associated with samples, a training data set may include one or more sample-label pairs (e.g., one or more associations between a sample and at least one label assigned to the sample). As another example, while an ontology is used to train a machine learning model to process certain types of inputs (e.g., certain types of documents like an MSA or a TA), a training data set is data that need not be specific to a certain type of model input. Therefore, providing a training data set allows a user of the machine learning system 100 greater flexibility in providing labels and samples for training a machine learning model as compared to providing ontologies.

In operation 502, the machine learning system accesses a first training data set corresponding to a first device. The first training data set can correspond to the first device insofar as the first device, associated with a first user account or some other credentials associated with a user of the first device, provided the first training data set to the machine learning system. When the machine learning system receives the first training data set, the machine learning system can store the first training data set in a database (e.g., the first device database 146a) that stores data associated with the first device (e.g., the first device 110).

The first training data set includes a first set of samples and one or more labels associated with each of the samples of the first set of samples. Each sample includes text, and each label of the training data set represents a classification of at least a portion of the text of the particular sample into one or more categories of information described by the label. For example, the samples can each be a paragraph of a legal contract. A first sample of the first training data set can be a paragraph corresponding to a section of the contract directed to an assignment, while a second sample of the first training data set can be a paragraph corresponding to a section of the contract directed to a notice required by a party of the contract. Accordingly, the first training data set can include the label "Assignment" for the first sample and "NoticeRequired" for the second sample.

In operations 504, the machine learning system uses the first training data set as input to a machine learning model engine of the machine learning system.

The machine learning system retrieves (e.g., from the iteration database 150) an iteration of a machine learning model which is to be trained. In operation 506, the machine learning model engine uses the first training data set to train the iteration of the machine learning model. For example, the machine learning engine (e.g., the machine learning engine 142) can use the first training data set (e.g., the first training data set 156) to train a first iteration of a machine learning model (e.g., the first iteration 148a, received from the iteration database 150). The result of training the iteration of the machine learning model (e.g., the first iteration 148a) is a trained machine learning model output by the machine learning engine (e.g., the machine learning engine 142 outputs the second iteration 148b).

In operation 508, the machine learning system receives, from a second device, a first model input. For example, the first model input (e.g., model input 152) can include text such as portions of a legal contract (e.g., an MSA or TA).

The second device provides the model input to the machine learning system so that the system inputs the model input to a machine learning model. For example, an intention of providing the model input to the machine learning model is to receive an output that includes labels assigned to the portions of text of the model input. Accordingly, a user of the second device can specify the ontology of the machine learning model that the user wants to process the model input. For example, if the model input is a portion of text from an MSA, the user of the second device can specify the MSA ontology, and in doing so, specify the machine learning model that corresponds to the MSA ontology as the machine learning model that should process the model input.

The first device and the second device are associated with respective credentials that allow a user of each device to provide training data corresponding to their respective device. For example, a first user may log into the first device using a first set of credentials, while a second user may log into the second device using a second set of credentials.

In operation 510, the machine learning system inputs the first model input to the machine learning model. Having been provided by the second device, the first model input can be associated with the second set of credentials. As described above, a user device can specify an ontology whose model should process the model input. Because there may be multiple iterations of the model input, (e.g., the first iteration 148a and the second iteration 148b) the machine learning system determines to which iteration the first model input should be input. For example, the machine learning system can input the first model input to the most recent iteration of the machine learning model (e.g., the second iteration 148b).

The machine learning model is configured to use the first model input to generate a first model output. For example, the model input 152 can be input to the second iteration 148b, which can output the model output 154. While a model input can include portions of a legal contract, a model output can be a marked-up version of the portions of the legal contract with each portion annotated with one or more labels that each describe a category of information to which the portion corresponds. The model output may also involve a classification of the document analyzed, an assessment of the document (e.g., risk in contract language, conventional terms, unusual provisions, and any number of other imaginable assessments), may include recommendations, may indicate errors, may highlight previously unseen provisions, and the like.

In operation 512, the machine learning system allows access of the model output to the first device and the second device. Although the second iteration 148b was trained using training data provided by the first device, both the first device and the second device can access the model output. Before allowing the first device access to the model output, the machine learning system can remove sensitive information from the model output, e.g., confidential information that is specific to the second device. Removing sensitive information can be done to provide data confidentiality for the second device.

The machine learning system 100 can send the model output 154 to the second device 120 through the network 130. The second device 120 gains the benefit of receiving an output from the second iteration 148b, which is a machine learning model that was trained on the training data (e.g., the first training data set 156) provided by the first device 110. Using training data received from multiple sources, e.g., multiple user devices, to train a machine learning model that is accessible to multiple user devices regardless of whether a user device provided training data to train the machine learning model is an example of federated machine learning. Machine learning models that employ federated machine learning can provide enhanced outputs compared to machine learning models that are only trained using training data received from only one source. For example, in a federated machine learning system, as described by the example of FIG. 1, either the first device 110 or the second device 120 can provide training data to be used to train a machine learning model which both devices can send model input to and receive model output from.

The machine learning system can access a second training data set corresponding to a second device. The second training data set can correspond to the second device insofar as the second device, associated with a second user account or some other credentials associated with a user of the second device, provided the second training data set to the machine learning system. When the machine learning system receives the second training data set, the machine learning system can store the second training data set in a database (e.g., the second device database 146b) that stores data associated with the second device (e.g., the second device 120).

Like the first training data set, the second training data set includes a second set of samples and one or more labels associated with each of the samples of the second set of samples. Each sample includes text, and each label of the training data set represents a classification of at least a portion of the text of the particular sample into one or more categories of information described by the label. In the example of FIG. 5, the first and second devices provide the first and second training data sets to be used to train a machine learning model that both devices can access.

In some implementations, the system allows access of the first training data set and the second training data set to the first device and the second device, respectively, and the system denies access of the first training data set and the second training data set to the second device and the first device, respectively. That is, although a first device can access a machine learning model trained using training data provided by a second device or using training data provided by the second device and the first device, the machine learning system 100 can restrict access of training data provided by the second device so that only the second device can access it (e.g., view or edit it). Allowing access of training data to only the device that provided the training data provides security in terms of preventing potentially confidential information of the training data from being viewed or edited by another device.

For example, the training data engine 144 can receive a request from the first device 110 to view the first training data set, which was provided by the first device. The machine learning system can verify that the first device 110 is associated with credentials and/or a user account that is authorized to view the first training data set. After the machine learning system performs the verification, the training data engine 144 can send the first training data set to the first device 110, e.g., through the network 130.

The first device 110 is permitted access to the data of the first device database 146a, which includes training data provided by the first device. However, the first device 110 is not permitted access to the data of the second device database 146b, which was provided by the second device 120. Similarly, the second device 120 is permitted access to the data of the second device database 146b, but not permitted access to the data of the first device database 146a.

Restricting access of a device to databases containing data provided by other devices provides data confidentiality for the devices of a federated machine learning system. Data confidentiality may be important if a device in a federated machine learning system provides sensitive information, e.g., information that is specific to the device or to one or more users of the device. In some implementations, the machine learning model engine 142 can be configured to receive training data but not store the training data to reduce the number of places where training data exists in the machine learning system 100. Furthermore, a machine learning model can adhere to certain data confidentiality rules, such that the model output that a machine learning model generates does not contain confidential information and therefore can be safely shared with each device that uses the machine learning system.

In some implementations, the machine learning system receives, from the second device a second training data set and uses the first training data set and the second training data set as input to the machine learning model engine. The machine learning system can receive the most recent machine learning model (e.g., the second iteration 148*b*) from the iteration database 150, which can train the machine learning model using the second training data set to output the updated machine learning model. The machine learning system can receive, from the second device, a second model input and input the second model input to the machine learning model, which can be configured to use the second model input to generate a second model output. The system can allow access of the model output to the first device and the second device.

In some implementations, a device can opt out of allowing its training data to be used to train a machine learning mode that is accessible to other devices. For example, a particular device that has opted out of this type of federated machine learning can receive a first iteration of a machine learning model from the machine learning system 100 (e.g., from the iteration database 150). The machine learning engine can train the first iteration of the machine learning model using training data provided by the particular device and output a private iteration of the machine learning model. The private iteration of the machine learning model can be accessible to only the particular device.

In some implementations, the machine learning system can receive, from the first device, feedback directed to improving the machine learning model. The machine learning engine of the machine learning system can use the feedback directed to improving the machine learning model to output an improved machine learning model. For example, the feedback can be directed to whether a label applied by a machine learning model is accurate. For example, a user of the device can determine that the machine learning model applied a NoticePeriod label to a sample that the user would have labeled as NoticeRequired rather than NoticePeriod. The machine learning system can receive this feedback and modify the ontology of the machine learning system to include the NoticeRequired label associated with the mislabeled sample. The machine learning engine can use the ontology to train a machine learning model and the engine can output the improved machine learning model.

In some implementations, the machine learning system can receive, from the second device, a third model input and input the third model input to the improved machine learning model. The improved machine learning model can be configured to use the third model input to generate a third model output and the machine learning system can allow access of the third model output to the first device and the second device. That is, although, the improved machine learning model may incorporate the feedback received from only the first device, both the first device and the second device receive the benefit of accessing the improved machine learning model.

In some implementations, the machine learning system can flag the feedback to be approved by a subject matter expert and use the feedback to generate an improved machine learning model only if the subject matter expert approves the feedback. A device (e.g., a user of the device) may unintentionally submit feedback that is not accurate (e.g., if the device submits a NoticePeriod label for a sample that should be associated with an NoticeRequired label). To ensure the accuracy of the feedback, the machine learning system can flag all feedback received from a device or a subset of devices. The machine learning system can display (e.g., using a user interface) the flagged feedback so that a subject matter expert can review the feedback and verify its accuracy.

In some implementations, the machine learning system 100 evaluates the performance of a machine learning model. Performance of a machine learning model can be evaluated using qualitative measurements, quantitative measurements, or a combination of qualitative and quantitative measurements.

An example of a quantitative measurement includes inputting a model input, which includes one or more samples, to a machine learning model and determining how many samples of the model input are correctly identified (e.g., labeled). A subject matter expert can generate or review the model input such that the expert has an expectation as to how each sample of the model input will be identified by the machine learning model.

For example, a subject matter expert can generate a model input using a user interface of the machine learning system 100. The model input can include a sample including text that reads, "Lessee may not assign operations hereunder, in whole or in part, without the prior written consent of Lessor". That is, the subject matter sample can enter text into the user interface or submit a file containing text. The machine learning system 100 can receive the model input and store it in a database (e.g., sample database 158).

The subject matter expert can identify that the sample should be assigned at least a "NoticeRequired" label (e.g., based on the subject matter expert's experience reviewing samples and labels using the user interface). When a machine learning model is provided with the model input to use to generate a model output, the subject matter expert can determine whether the machine learning model correctly identified the NoticeRequired label by determining whether the model output includes the NoticeRequired label associated with the identified sample. That is, the subject matter expert can view the model output using the user interface. The model output can include a list of samples included in the model input and, for each sample of the list of samples, a label assigned to the sample by the machine learning model. The subject matter expert can tally the number of correct assignments of labels in the model output to determine a percentage of correct assignments to the total number of assignments of labels in the model output. This percentage can represent a quantitative measurement of the success of the machine learning model.

While a quantitative measurement of the success of a machine learning model may require a subject matter expert to provide a correct or desired output for the machine learning model, a qualitative measurement of the success of a machine learning model can include comparing the outputs of different machine learning models. An example of a qualitative measurement includes providing the same model input to multiple different machine learning models and determining differences in the model outputs generated by the multiple different machine learning models.

For example, the machine learning system 100 can provide a model input as input to both a first machine learning model and a second machine learning model. The machine learning system 100 can compare the output of the first machine learning model to the output of the second machine learning model to determine differences in the two outputs. For example, the model input can be a set of contracts received from a device communicatively coupled to the machine learning system 100. If, for example, the first machine learning model generates an output that includes 100 samples that were labeled "NoticeRequired", while the second machine learning model generates an output that includes 500 samples that were assigned the same label, then the machine learning system 100 can determine that the number of NoticeRequired labels has increased.

In some implementations, if, between the outputs of two different machine learning models, the number of samples that receive the same label increases by a threshold amount or more, the machine learning system 100 can generate an alert that can be viewed by a subject matter expert. In some implementations, the threshold amount can be set by an administrator of the machine learning system 100. In other implementations, the threshold amount can be set by a subject matter expert, (e.g., the subject matter expert to whom a generated alert is sent).

In the example described above, the number of samples that received the label "NoticeRequired" increased by 400 samples between the outputs of the first and second machine learning models. If the threshold amount of samples is 300 samples, then the machine learning system 100 can generate an alert (e.g., one that includes the increase in the number of samples). The alert can be received by a subject matter expert, (e.g., at a user interface accessible to the subject matter expert).

In response to receiving an alert that the number of samples that received a common label increased by a threshold amount between machine learning models, a subject matter expert may review the ontologies of the different machine learning models using a user interface. Receiving such an alert can be beneficial to a user of the system, for example, because a review of the ontologies can reveal strategies for ways to improve the training of a machine learning model (e.g., by revealing the differences in the training data used to train the machine learning models).

A subject matter expert can review the multiple outputs generated by the machine learning model in response to the alert. As an example, the machine learning system 100 can determine which additional samples between the outputs were assigned the same label, that is, which samples were assigned the label in a first output, that were not assigned the label in a second output. By reviewing the additional samples between the outputs, a subject matter expert may find that some of the additional samples were not labeled correctly, and therefore should not have been assigned the label identified for them by the machine learning model. Identifying incorrect assignments of labels can allow the machine learning system 100 and/or a subject matter expert to determine why the samples were not labeled correctly, and how to improve the ontology of the machine learning model to avoid future incorrect assignments of labels.

Figure 6A:
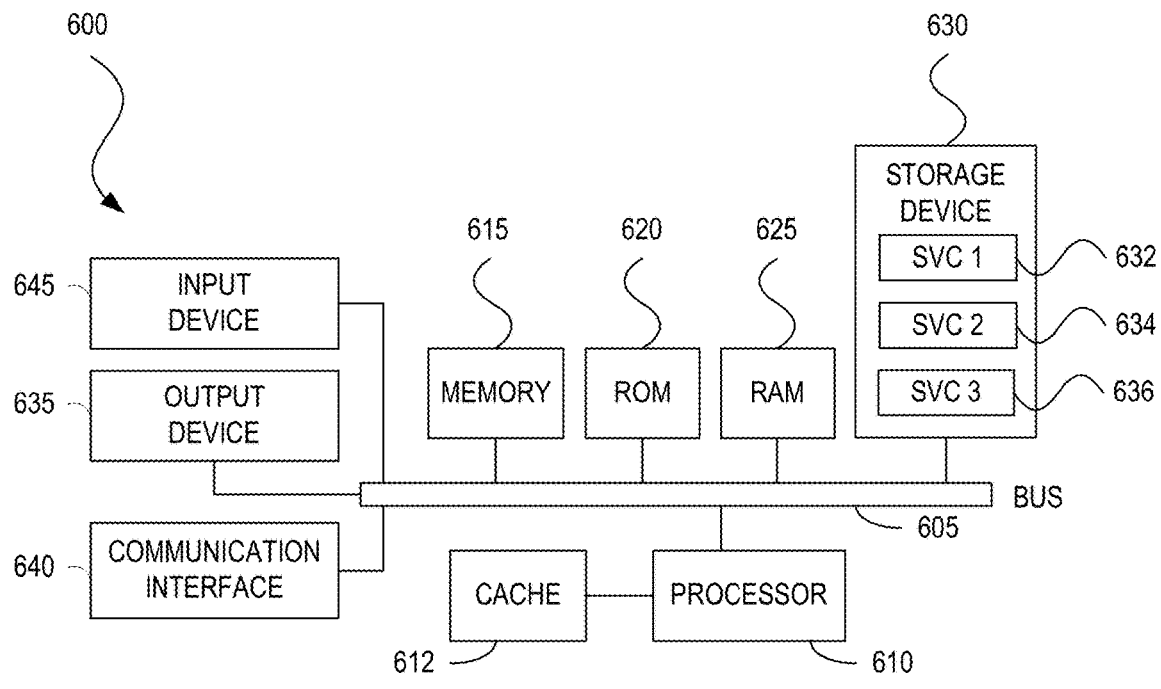
FIGS. 6(A) and 6(B) illustrate systems, according to one aspect of the present disclosure.
Figure 6B:
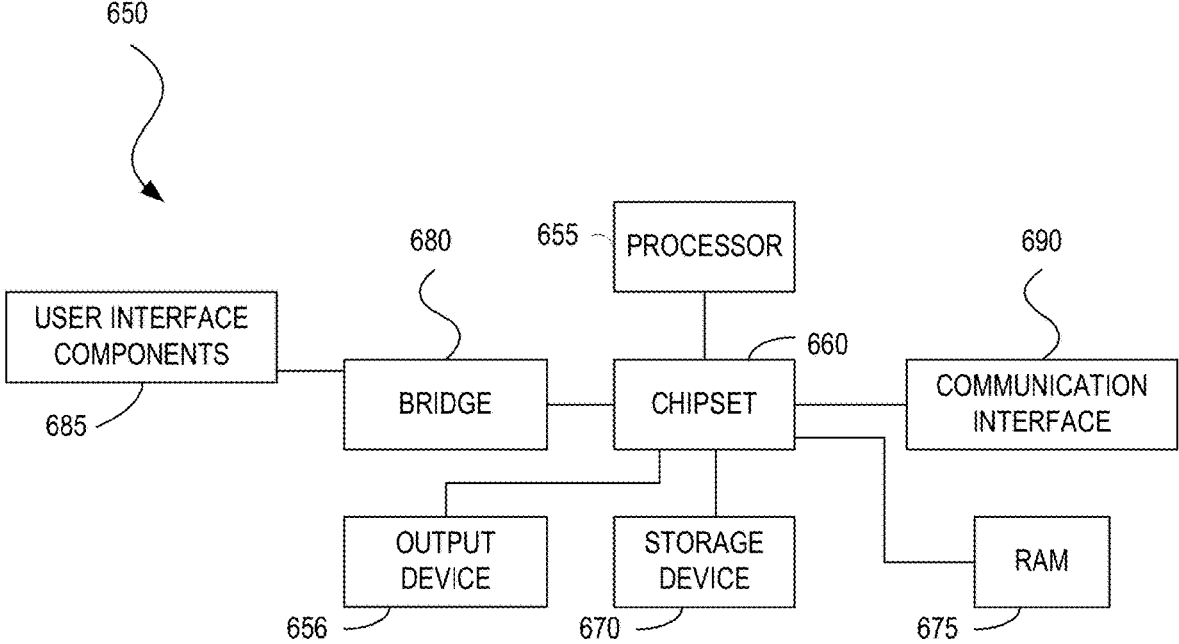

FIGS. 6A and 6B illustrate systems, according aspects of the present disclosure. The more appropriate system will be apparent to those of ordinary skill in the art when practicing the various embodiments. Persons of ordinary skill in the art will also readily appreciate that other systems are possible.

FIG. 6A illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as services (SVC) 1 632, SVC 2 634, and SVC 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software SVCs 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 656, such as a display, and can read and write information to storage device 670, which can include magnetic media, solid state media, and other suitable storage media. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 655 analyzing data stored in the storage device 670 or the RAM 675. Further, the computing system 650 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

Claim language reciting "at least one of" refers to at least one of a set and indicates that one member of the set or multiple members of the set satisfy the claim. For example, claim language reciting "at least one of A and B" means A, B, or A and B.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

What is claimed is:

1. A method performed by a machine learning system comprising one or more processors, the method comprising:
  obtaining, from a computer readable medium, a first ontology to train a first machine learning model received from a first computing device, the first ontology including one or more labels, each label of the one or more labels being associated with a sample that includes text, wherein the machine learning system is configured to use a particular label of the one or more labels to retrieve one or more samples associated with the particular label;
  receiving an identification of a label of the first ontology associated with the first machine learning model to share with a second ontology associated with a second machine learning model received from a second computing device, the label including information for training a model, the second ontology stored on the computer readable medium with the first ontology;
  sharing with the second ontology, the label and the information associated with the label while restricting the second ontology from accessing additional information of the first ontology to maintain the security of the additional information of the first ontology; and
  training the second machine learning model using the shared information associated with the label.

2. The method of claim 1 wherein the information associated with the label includes a sample of text representative of a category of information for the label.

3. The method of claim 2 wherein training the second machine learning model comprises using the sample of the text representative of the category of information for the label to identify the category of information in a document analyzed by the second model.

4. The method of claim 1 wherein the information associated with the label includes at least one of text representative of a category of information for the label, a vector representation of the text representative of a category of information for the label, a feature representation of the label, and machine learning model weights.

5. The method of claim 1 further storing the information associated with the label to restrict access to the information by a system utilizing processing data with the second model.

6. The method of claim 5 wherein the system includes a device of a user processing data with the second model.

7. The method of claim 1 wherein the second ontology is an existing ontology that includes one or more labels.

8. The method of claim 1, further comprising automatically including a new information for the label updated with respect to the first ontology with the shared label of the second ontology.

9. The method of claim 1 further comprising automatically including a new information for the shared label of the second ontology with the label of the first ontology.

10. The method of claim 1, wherein the information related to the label of the first ontology can include one or more machine learning parameters and a weight associated with each of the one or more machine learning parameters.

11. The method of claim 1, wherein the information related to the label of the first ontology can include features associated with the label of the first ontology.

12. A system comprising:
  a first ontology stored in a first computer readable medium, the first ontology including a first label and information associated with the first label, the information utilized to train a first machine learning model received from a first computing device to identify a category of information represented by the first label;
  a second ontology stored in a second computer readable medium, wherein the first computer readable medium and the second computer readable medium are the same computer readable medium, and
  a processor to run computer executable instructions to cause the processor to:
    generate a user interface, the user interface depicting a representation of the first ontology, and operable to share the first label and information associated with the first label with the second ontology while restricting the second ontology from accessing additional information of the first ontology to maintain the security of the additional information of the first ontology, whereby the second ontology includes the first label and information associated with the first label, the information utilized to train a second machine learning model received from a second computing device to identify the category of information represented by the first label.

13. The system of claim 12 wherein the second ontology including a second label and information associated with the second label, the information associated with shared first label and the information associated with the second label utilized to train the second machine learning model to identify a category of information represented by the shared first label and a category of information associated with the second label.

14. The system of claim 12 wherein access to the shared information of the second label is restricted based on a user ID.

15. The system of claim 12 wherein the information associated with the first label includes a sample of text representative of a category of information for the label.

16. The system of claim 15 the computer executable instructions to train the second machine learning model using the sample of the text representative of the category of information for the first label to identify the category of information in a document analyzed by the second model.

17. The system of claim 12 wherein the information associated with the first label includes at least one of text representative of a category of information for the first label, a vector representation of the text representative of a category of information for the first label, a feature representation of the first label, and machine learning model weights.

18. A method performed by a machine learning system comprising one or more processors, the method comprising:
  obtaining, from a computer readable medium, a first ontology to train a first machine learning model received from a first computing device, the first ontology including one or more labels, each label of the one or more labels being associated with a sample that includes content, wherein the machine learning system is configured to use a particular label of the one or more labels to retrieve one or more samples associated with the particular label;
  receiving an identification of a label of the first ontology associated with the first machine learning model to share with a second ontology associated with a second machine learning model received from a second computing device, the label including information for training a model, the second ontology stored on the computer readable medium with the first ontology;

sharing with the second ontology, the label and the information associated with the label while restricting the second ontology from accessing additional information of the first ontology to maintain the security of the additional information of the first ontology; and training the second machine learning model using the shared information associated with the label.

19. The method of claim 18 wherein the content of the sample is textual content from one of the first computing device or the second computing device, and the system not allowing access by the second computing device to the sample if the sample was obtained from the first computing device, or the system not allowing access by the first computing device to the sample if the sample was obtained from the second computing device, wherein the system allows both the first computing device and the second computing device to access the first machine learning model and the second machine learning model.

* * * * *